(12) United States Patent
Kawamura et al.

(10) Patent No.: US 8,014,258 B2
(45) Date of Patent: Sep. 6, 2011

(54) OPTICAL PICKUP HAVING RADIALLY ARRANGED LENSES IN A LOW PROFILE CONSTRUCTION

(75) Inventors: Tomoto Kawamura, Tokyo (JP);
Yoshiro Konishi, Yokohama (JP);
Toshimasa Kamisada, Yokohama (JP);
Yasuo Kitada, Odawara (JP)

(73) Assignee: Hitachi Media Electronics Co., Ltd., Oshu-shi (JP)

( * ) Notice: Subject to any disclaimer, the term of this patent is extended or adjusted under 35 U.S.C. 154(b) by 0 days.

(21) Appl. No.: 12/776,223

(22) Filed: May 7, 2010

(65) Prior Publication Data
US 2010/0214904 A1    Aug. 26, 2010

Related U.S. Application Data

(63) Continuation of application No. 11/712,184, filed on Feb. 27, 2007, now Pat. No. 7,733,760.

(30) Foreign Application Priority Data

Oct. 18, 2006    (JP) ................................. 2006-283246

(51) Int. Cl.
*G11B 7/00*    (2006.01)
(52) U.S. Cl. .................................. 369/112.24; 369/121
(58) Field of Classification Search ........................ None
See application file for complete search history.

(56) References Cited

U.S. PATENT DOCUMENTS

| 6,111,827 | A | 8/2000 | Miike |
| 7,289,417 | B2 | 10/2007 | Kim et al. |
| 7,564,745 | B2 | 7/2009 | Kanaya et al. |
| 2005/0007906 | A1 | 1/2005 | Horinouchi et al. |
| 2006/0007812 | A1 | 1/2006 | Nishi |
| 2006/0181977 | A1 | 8/2006 | Heor |
| 2006/0285473 | A1 | 12/2006 | Kan |

(Continued)

FOREIGN PATENT DOCUMENTS

JP    08-329517 A    12/1996

(Continued)

OTHER PUBLICATIONS

Matsuo et al. "Optical Pickup for BD/DVD/CD Drive with 12.7mm Height," IEEE Optical Data Storage Topical Meeting, ODS '09 (Jun. 2006).

(Continued)

*Primary Examiner* — Paul Huber
(74) *Attorney, Agent, or Firm* — Kilpatrick Townsend & Stockton LLP (57) ABSTRACT

An optical pickup includes a first source which emits a first beam with a first wavelength; a second source which emits a second beam with a wavelength shorter than the first wavelength; a first collimate lens which collimates the first beam; a second collimate lens which collimates the second beam; a first objective lens which converges the first collimated beam onto an optical disc; and a second objective lens which converges the second collimated beam onto the disc. The first and second objective lenses are arranged in the disc radial direction. The second objective lens is arranged closer to the side of the disc outer circumference than the first objective lens. The first collimate lens is arranged on the right-hand side when the second objective lens is viewed from the first objective lens. The second collimate lens is arranged on the left-hand side when the first objective lens is viewed from the second objective lens. The gap between the first collimate lens and the first objective lens is larger than the gap between the second collimate lens and the second objective lens.

7 Claims, 7 Drawing Sheets

U.S. PATENT DOCUMENTS

2009/0016178 A1  1/2009  Kim et al.

FOREIGN PATENT DOCUMENTS

| JP | 10-064114 A | 3/1998 |
| JP | 2003-281758 | 10/2003 |
| JP | 2005-302164 A | 10/2005 |
| JP | 2006-172610 | 6/2006 |

OTHER PUBLICATIONS

Japan Patent Office office action for patent application JP2006-283246 (Mar. 29, 2011).

OPTICAL PICKUP HAVING RADIALLY ARRANGED LENSES IN A LOW PROFILE CONSTRUCTION

CROSS-REFERENCE TO RELATED APPLICATION

This application is a continuation application of U.S. patent application Ser. No. 11/712,184, filed on Feb. 27, 2007, which claims priority from Japanese Application JP-2006-283246, filed on Oct. 18, 2006, the content of which is hereby incorporated by reference into this application.

BACKGROUND OF THE INVENTION

The present invention relates to an optical pickup and an optical disc drive.

As a background art of the present technical field, an actuator mounting two objective lenses in the optical disc radial direction is disclosed in Japanese Patent Laid-open No. 2003-281758 (hereinafter referred to as Reference 1). A means for downsizing two objective lenses mounted on an optical pickup is disclosed in Japanese Patent Laid-open No. 2006-172610 (hereinafter referred to as Reference 2). An optical pickup which mounts two objective lenses in the optical disc radial direction is disclosed in Optical Data Storage 2006 Topical Meeting Conference Proceedings WPD3 (FIG. 2 in Clause 33) (hereinafter referred to as Reference 3).

SUMMARY OF THE INVENTION

In recent years, as an optical disc, compact disc (CD), digital versatile disc (DVD), and Blu-ray disc (BD) have been available. Each of CD, DVD, and BD optical disc drives has a different wavelength of light emitted from a laser light source, a different thickness of a cover layer of an optical disc, and a different numerical aperture (NA) of objective lens. An optical pickup for CD and DVD generally uses only one objective lens because the wavelength, NA, and cover layer thickness have been compensated through the use of an objective lens of diffraction type.

With an optical pickup for CD, DVD, and BD, however, using only one objective lens causes many challenges with respect to the performance although it is not unrealizable. When an objective lens of diffraction type is used to compensate the wavelength, NA, and cover layer thickness, the objective lens must have a deep-groove structure, resulting in a significantly degraded transmission efficiency of the objective lens. In particular, the degradation is significant for CD, and the transmission efficiency of the objective lens is almost halved. Therefore, it is necessary that light be emitted from the laser light source with power that is at least twice the power in conventional cases. Thus, high-power laser emission from the laser light source not only shortens the life of the laser light source but also increases the heat release of the optical disc drive. Accordingly, a cooling structure needs to be improved, which is disadvantageous for downsizing. Furthermore, an optical beam not transmitted by the objective lens becomes unnecessary light which enters a Photo Detector (PD). In this case, challenges arise such as degraded reading performance and servo signal performance.

Therefore, it can be considered that the optical pickup for CD, DVD, and BD uses two different objective lenses: one is an objective lens of diffraction type used for the above-mentioned optical pickup for CD and DVD and the other is an objective lens dedicated to BD.

However, a thin optical disc drive in notebook personal computers, etc., in particular, has a small space for mounting optical components, which makes it difficult to mount optical components of an optical pickup mounting two objective lenses.

Then, Reference 1 does not disclose any embodiment of optical components other than two objective lenses and actuators.

In Reference 2, optical beams are independently applied from a direction equivalent to the optical disc radial direction to objective lenses arranged in the optical disc tangential direction. In the case of a thin disc drive having a restriction on radial dimensions, it is not possible to mount these components on the thin optical disc drive with the configuration of Reference 2. With the configuration in which objective lenses are arranged in the optical disc tangential direction, either of these objective lenses will cause off-track. This causes a restriction that the Differential Push Pull Method (hereinafter referred to as DPP), one of the most generally used methods for detecting a tracking error signal (hereinafter referred to as TES), cannot be used.

Reference 3 discloses an optical pickup configuration in which two objective lenses are arranged in the tangential direction of an optical disc in a thin optical disc drive. Since optical paths for BD, DVD, and CD are once combined and then branched again directly under the objective lenses, two branch elements are required. However, it is difficult to realize desired transmission and reflection characteristics using a branch element for each of wavelengths of light beams used for CD, DVD, and BD. Also, the element is susceptible to an optical axis shift because the light beams pass through a common optical path. Moreover, since antireflection coating of optical components depend on the wavelength of the entering optical beam, there arises a problem of degraded transmission factor of optical components arranged in the common optical path through which light beams for CD and those for BD pass, the light beam for CD being different in wavelength twice from that for BD. Furthermore, since the objective lenses are arranged in the tangential direction, there is a restriction that the DPP cannot be used.

An object of the present invention is to provide a thin optical pickup and an optical disc drive for three different media BD, DVD, and CD.

The above-mentioned object can be attained with a configuration described in the appended claims of the present invention.

In accordance with the present invention, it is possible to provide a thin optical pickup and an optical disc drive for three different media of BD, DVD, and CD.

BRIEF DESCRIPTION OF THE DRAWINGS

These and other features, objects and advantages of the present invention will become more apparent from the following description when taken in conjunction with the accompanying drawings wherein.

DETAILED DESCRIPTION OF PREFERRED EMBODIMENTS

In each embodiment of the present invention, an example will be explained on the assumption of three different media BD, DVD, and CD. However, each embodiment of the present invention is not limited to three different media BD, DVD, and CD, and application of the present invention to other optical discs such as HD-DVD causes no problem. Moreover, although the following explains the present invention in detail based on embodiments shown in the drawings, the present invention is not limited by the explanations.

First Embodiment

A first embodiment of the present invention will be explained below in detail with reference to the accompanying drawings. The following explains an optical pickup mounted on a thin optical disc drive for BD and DVD.

Figure 1:
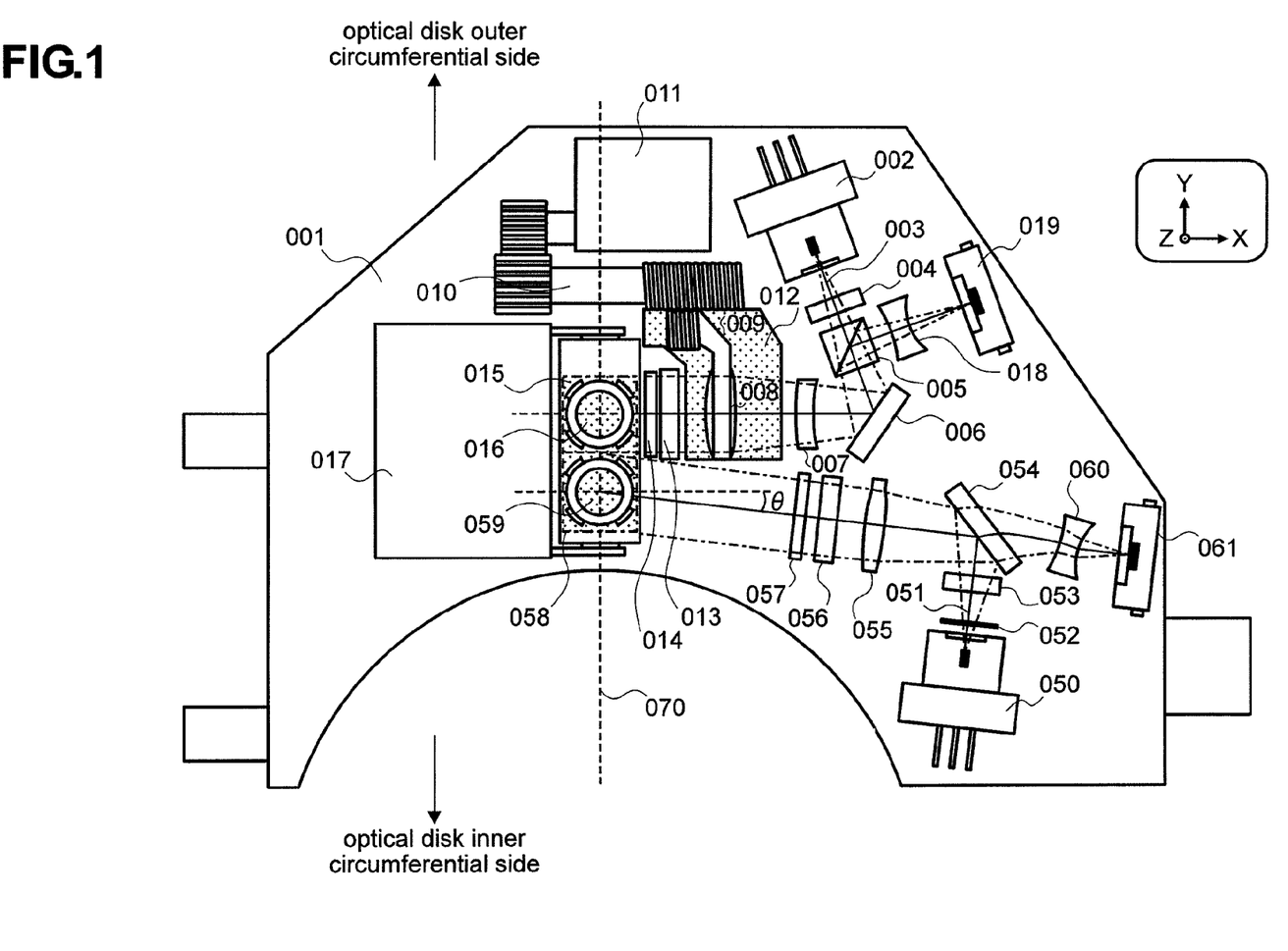
FIG. 1 is a schematic diagram showing a configuration of an optical pickup 001 according to a first embodiment of the present invention.

FIG. 1 is a schematic diagram showing a configuration of an optical pickup 001 according to the first embodiment. First of all, the following explains a BD optical system.

An optical beam is emitted from a BD laser light source 002 as divergent light. In order to write information to or read information from to BD, it is common to use a semiconductor laser with a wavelength from 395 nm to 415 nm. The BD laser light source 002 emits an optical beam with a wavelength of about 405 nm. Moreover, a semiconductor laser generally emits a linearly-polarized optical beam, and it is assumed that the BD laser light source 002 also emits a linearly-polarized optical beam. A path of the BD optical beam emitted from the BD laser light source 002 is shown by a solid line 003. Dashed lines in line-symmetry with respect to the solid line 003 indicate the outermost circumference of the diffusion of the optical beam.

The optical beam emitted from the BD laser light source 002 enters a BD diffraction grating 004. The optical beam is branched into a main light beam and two sub light beams by the BD diffraction grating 004 (paths of sub light beams not shown). The two sub light beams are used to generate a DPP-based TES and a focal error signal (hereinafter referred to as FES) based on the Differential Astigmatic Detection (hereinafter referred to as DAD). The DPP and DAD are well-known technologies and therefore their explanations are omitted.

After passing through the BD diffraction grating 004, the optical beam transmits through a polarization beam splitter 005, reflects off a reflecting mirror 006, and enters an auxiliary lens 007. After transmitting through the auxiliary lens 007, the optical beam is converted into an approximately-parallel optical beam by a BD collimate lens 008 mounted on a lens holder 009 which is connected to a BD collimate lens drive unit 011 through a shaft 010. The drawing assumes that the BD collimate lens drive unit 011 uses a general stepping motor. By operating the shaft 010 and the lens holder 009 using the revolution of this stepping motor as power, the mechanism of the unit 011 is such that the BD collimate lens 008 can be moved in a direction in parallel with the optical beam entering the BD collimate lens.

After passing through the BD collimate lens 008, the optical beam enters a chromatic aberration correction element 013 which corrects chromatic aberrations caused by wavelength fluctuation of the BD laser light source 002 and temperature change of the optical pickup 001. Although either a combination of lenses or a lens of diffraction type is generally used as a chromatic aberration correction element, the use of a lens of diffraction type is more effective for downsizing. The integration of the BD collimate lens 008 with the chromatic aberration correction element 013, for example by making a diffraction groove for chromatic aberrations correction on the collimate lens, is effective for downsizing with reduced number of components. Moreover, the use of such a configuration causes no problem.

After passing through the chromatic aberration correction element 013, the optical beam enters a BD quarter wavelength plate 014 and is converted into circularly-polarized light. After passing through the BD quarter wavelength plate 014, the optical beam reflects off a BD upward-reflection mirror 015 in the z direction, enters a BD objective lens 016, and is converged onto the BD data layer (not shown). The BD objective lens 016, mounted on an actuator 017, can be operated in the y and z directions in the drawing. The y direction is used for TES-based control and actuation at the time of lens shift, and the z direction for FES-based control.

For the BD objective lens 016, an area within an effective diameter of the lens is hatched.

After reflecting off the data layer, the optical beam passes through the BD objective lens 016, the BD upward-reflection mirror 015, the chromatic aberration correction element 013, the BD collimate lens 008, the auxiliary lens 007, the reflecting mirror 006, the polarization beam splitter 005, and a BD detection lens 018, then reaches a BDPD 019. When the BD detection lens 018 consists of a cylindrical lens and a spherical lens. When the light beam penetrates into the BD detection lens 018, predetermined astigmatism is given in a direction of about 45 degrees and used for detection of the FES. The function of this BD detection lens 018 is to rotate the astigmatism in a desired direction as well as determine the size of the light spot converged onto the BDPD 019. The optical beam guided by the BDPD 019 is used for detection of an information signal recorded on the BD data layer and detection of positional control signals, such as TES and FES, for the light spot converged onto the optical disc.

Then, an optical path ranging from the BD laser light source 002 to the BD data layer is referred to as a forward path, and an optical path ranging from the data layer to the BDPD 019 is referred to as a return path. The storage capacity of BD is about five times that of DVD, and an information pit of the BD data layer is smaller than that of DVD. In order to read this information spot, therefore, it is necessary that a light spot to the BD data layer be smaller than that to the DVD data layer. The light spot strongly depends not only on the NA of objective lens and the wavelength of laser light source but also on the forward path magnification (combined focal length of the auxiliary lens 007 and the collimate lens 008 divided by the focal length of objective lens). The size of the converged light spot can be reduced by increasing this forward path magnification. Therefore, it is necessary that the forward path magnification of the BD optical system be larger than that of the DVD optical system. When general semiconductor laser is used and the light beam emitted therefrom is not to be shaped, it is preferable that the forward path magnification be multiplied by about 5 to 7 for DVD and by about 10 to 14 for BD.

When it is assumed that the auxiliary lens 007 is not used in the BD optical system, the focal length of the BD collimate lens 008 must be increased for a higher magnification, which makes it impossible to store the BD laser light source 002 in the outer shape of the optical pickup. Therefore, the use of the auxiliary lens 007 is effective for downsizing the total configuration while maintaining the effective forward path magnification.

Conversely, if the total configuration is downsized too much while maintaining the forward path magnification, the laser light source 002 may come into contact with the BDPD 019 which are particularly large components in the optical pickup, making the arrangement impossible. Then, it would be preferable that the focal length of the auxiliary lens 007 and BD collimate lens 008 be set so that the laser light source 002 may not come into contact with the BDPD 019 while maintaining the forward path magnification.

The reflecting mirror 006 is arranged so that the BD laser light source 002 and BDPD 019 may not protrude from the outer shape and, as mentioned later, the mirror 006 may not come into contact with the DVD optical system.

For BD, an objective lens with a large NA (0.85) is used to reduce the size of the light spot converged onto the BD data layer. However, spherical aberrations caused by a thickness error of the cover layer increase in proportion to the 4th power of the NA. For BD, since spherical aberrations caused by the thickness error of this cover layer cannot be ignored, a mechanism for correcting spherical aberrations is required. In order to correct spherical aberrations, it is common to change the form of the optical beam entering the objective lens from parallelism to weak divergence and weak convergence. In the present embodiment, means for changing the form of the optical beam entering the BD objective lens 016 from parallelism to weak divergence and weak convergence is realized by arranging the BD collimate lens drive unit 011 and moving the BD collimate lens 008 in the optical axis direction.

It is known that the dynamic range and correction sensitivity in spherical aberrations correction depend on the focal length of the BD collimate lens 008. Specifically, a short focal length results in a narrow dynamic range and a high correction sensitivity, and a long focal length results in a wide dynamic range and a low correction sensitivity. The thickness error of the BD cover layer is specified by a standard, for example, the cover layers of 2-layer BD changes within a range from 70 to 105 micrometers. If the focal length of the BD collimate lens 008 is long, the dynamic range for correcting spherical aberrations caused by the thickness error of this cover layer increases, which is not suitable for downsizing. Conversely, if the focal length is too short, the correction sensitivity becomes too high and accordingly actuation at finer steps is required. Therefore, it would be preferable that the focal length of the BD collimate lens 008 be within a range from about 9 mm to 12 mm.

The following explains the DVD optical system.

An optical beam is emitted as divergence light from a DVD laser light source 050. In order to write information to or read information from to DVD, it is common to use a semiconductor laser with a wavelength of 660 nm. The DVD laser light source 050 emits an optical beam with a wavelength of about 660 nm. Moreover, it is assumed that the DVD laser light source 050 also emits a linearly-polarized optical beam. The path of the DVD optical beam emitted from the DVD laser light source 050 is shown by a solid line 051. Dashed lines in line-symmetry with respect to the solid line 051 indicate the outermost circumference of the diffusion of the optical beam.

The optical beam emitted from the DVD laser light source 050 enters a half wavelength plate 052 and is converted into linearly-polarized light in a predetermined direction, then enters a DVD diffraction grating 053. The optical beam is branched into a main light beam and two sub light beams by the DVD diffraction grating 053 (paths of sub light beams not shown). The two sub light beams are used to generate a DPP-based TES and a DAD-based FES.

After passing through the DVD diffraction grating 053, the optical beam reflects off a beam splitter 054 and is converted into an approximately-parallel optical beam by a DVD collimate lens 055.

After passing through the DVD collimate lens 055, the optical beam enters a liquid crystal aberration correction element 056 having a function for correcting coma aberrations in a predetermined direction, as mentioned in detail later. After passing through the liquid crystal aberration correction element 056, the optical beam enters a DVD quarter wavelength plate 057 and is converted into circularly-polarized light.

Although two lenses (DVD and BD objective lenses) are mounted, when actually creating the optical pickup 001, an optimal tilt angle in each of the optical disc radial and tangential directions may differ between the DVD objective lens 059 and the BD objective lens 016. The liquid crystal aberration correction element 056 is mounted to correct the shift of this optimal tilt angle. Since the shift of the tilt angle corresponds to coma aberrations, the liquid crystal aberration correction element 056 is mounted so that coma aberrations in the optical disc radial and tangential directions be corrected.

After passing through the DVD quarter wavelength plate 057, the optical beam reflects off the DVD upward-reflection mirror 058 in the z direction, enters the DVD objective lens 059, and is converged onto the DVD data layer (not shown). The BD objective lens 059, also mounted on an actuator 017, can be operated in the y and z directions in the drawing.

Also for the BD objective lens 059, an area within an effective diameter of the lens is hatched in the drawing.

After reflecting off the data layer, the optical beam passes through the DVD objective lens 0059, a DVD upward-reflection mirror 058, the beam splitter 054, and a DVD detection lens 060, then reaches a DVDPD 061. When the optical beam penetrates through the beam splitter 054, astigmatism is given for detection of the FES. The function of the DVD detection lens 060 is to rotate the astigmatism in a desired direction as well as determine the size of the light spot converged onto the DVDPD 061. The optical beam guided by the DVDPD 061 is used for detection of the information signal recorded on the DVD data layer and detection of positional control signals, such as TES and FES, for the light spot converged onto the DVD data layer.

Moreover, a dotted line 070 in the x direction agrees with the optical disc radial direction and the optical pickup seek direction. Moreover, as shown in the drawing, the topside corresponds to the optical disc outer circumferential direction and the bottom side the optical disc inner circumferential direction.

The following describes the fact that the BD and DVD optical beams are larger than the effective diameter of the objective lenses as shown in FIG. 1. In an optical disc drive, when writing information to or reading information from a predetermined track, the information is accessed not only by seeking the optical pickup in the optical disc radial direction but also by moving the objective lenses in the optical disc radial direction by operating the actuator mounting the objective lenses. Moving the objective lenses in the optical disc radial direction by operating the actuator is referred to as a lens shift. A lens shift of about ±0.3 mm is common. Specifically, the optical beam entering an objective lens must be larger than the effective diameter of the objective lens by at least about ±0.3 mm in the optical disc radial direction.

For the above reason, the BD and DVD optical beams are larger than the effective diameter of the objective lenses in FIG. 1.

Then, as shown in FIG. 1, the traveling direction of the optical beam entering the DVD upward-reflection mirror 058 is tilted by an angle of θ with respect to that of the optical beam entering the BD upward-reflection mirror 015. This arrangement is used since a mutual interference between BD and DVD optical components is avoided.

Figure 2:
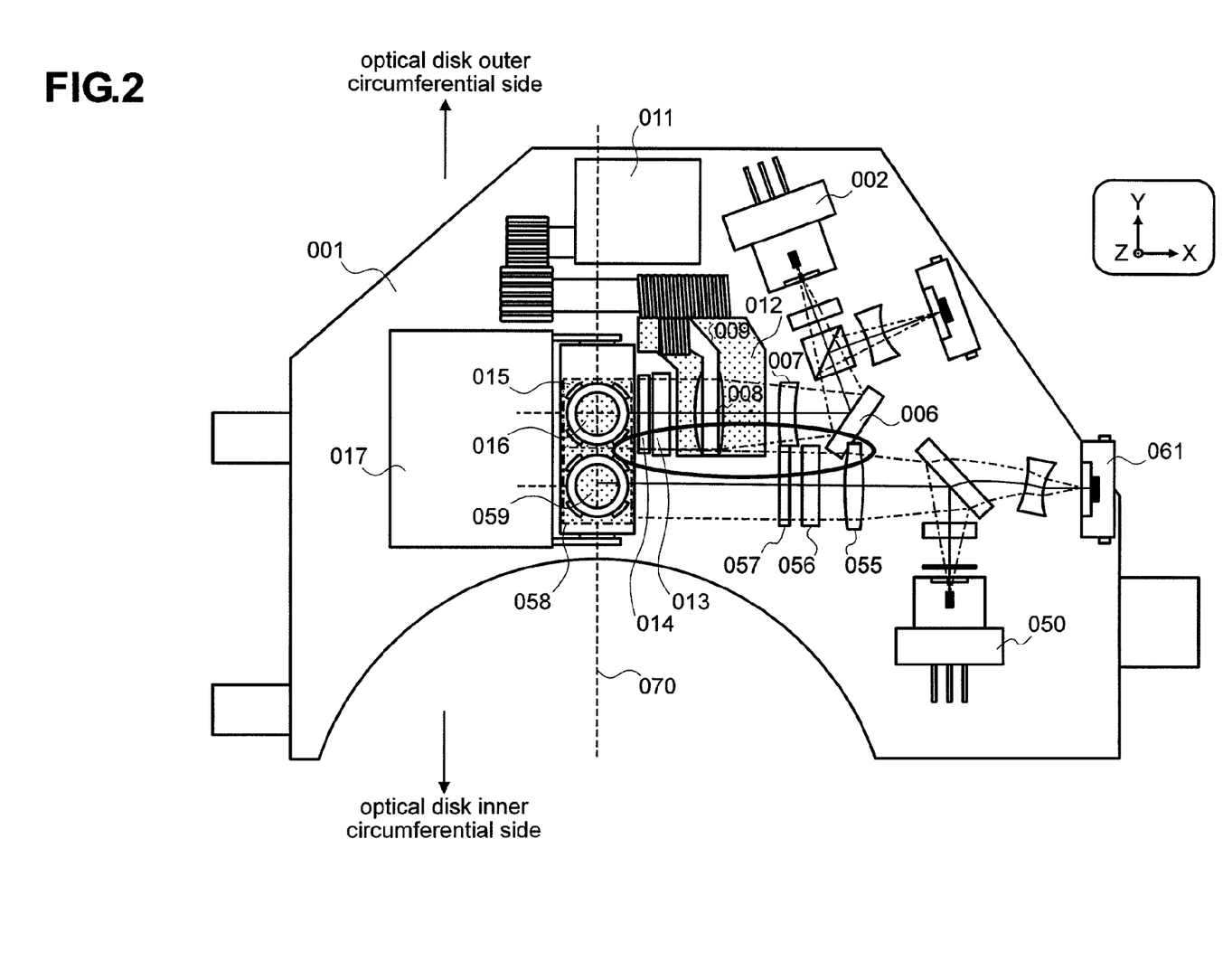
FIG. 2 is a schematic diagram showing an effect of tilted traveling directions of BD and DVD optical beams according to the first embodiment of the present invention.

FIG. 2 shows another case of the optical pickup 001 in which the traveling directional angle of the optical beam entering the BD upward-reflection mirror 015 is the same as that of the optical beam entering the DVD upward-reflection mirror 058, i.e., the angle θ shown in FIG. 1 is zeroed. As shown in FIG. 2, there is an area where the BD collimate lens 008, chromatic aberration correction element 013, and quarter wavelength plate overlap the DVD optical beam. Moreover, when the BD collimate lens 008 operates in the incidence optical axis direction, a movable range of the BD collimate lens 008 and lens holder 009 is shown as an area 012 hatched with dots. If the BD collimate lens 008 is operated as shown in the drawing, it may overlap the DVD optical beam in a remarkable range. Therefore, it is not possible to install a wall between the BD and DVD optical beams, arising a problem of insufficient strength of the optical pickup.

For this reason, the traveling direction of the optical beam entering the DVD upward-reflection mirror 058 is tilted by an angle of θ with respect to that of the optical beam entering the BD upward-reflection mirror 015.

Moreover, if the DVD collimate lens 055 is arranged directly under the DVD upward-reflection mirror 058, an area overlapping the BD optical components cannot be avoided. Therefore, the DVD collimate lens 055 is arranged further in the x direction than the BD collimate lens 008 as shown in the drawing, thus avoiding areas where each of DVD and BD optical component overlaps.

For example, although it seems that the angle θ can be zeroed by arranging the BD objective lens 016 and DVD objective lens 059 with a gap in the optical disc radial direction, the angle cannot actually be zeroed. If the gap in the optical disc radial direction between the BD objective lens 016 and the DVD objective lens 059 is minimized, there is an advantage that the performance of the actuator can be improved. If the gap in the optical disc radial direction between the BD objective lens 016 and the DVD objective lens 059 is large, it would be impossible to read information from or write information to the outermost and innermost circumferences of the optical disc.

Figure 3:
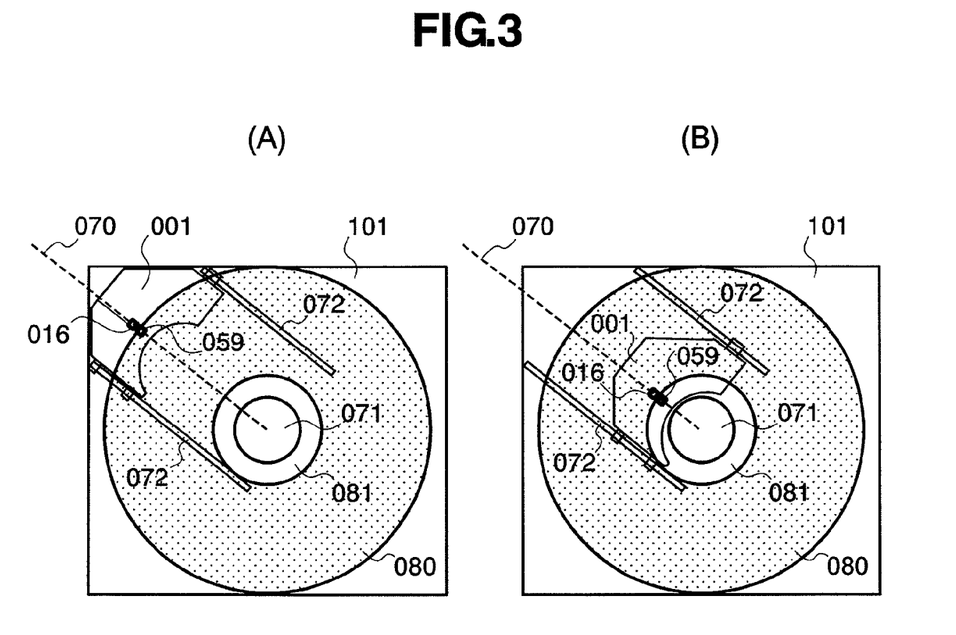
FIG. 3 is a schematic diagram showing a reason why two objective lenses must be brought close to each other according to the first embodiment of the present invention.

FIG. 3 shows a thin optical disc drive 101 for notebook personal computers, mounting the optical pickup 001. FIG. 3A shows a case when the optical pickup 001 is arranged at the outermost circumference, and FIG. 3B a case when it is arranged at the innermost circumference.

With the optical disc drive 101, an optical disc 080 is fixed to a spindle 071 for rotating an optical disc 080. Moreover, the configuration of the optical pickup 001 is such that it can access the optical disc in the radial direction along two guide bars 072.

When reading the DVD outermost circumference, the optical beam emitted from the optical pickup 001 must be applied to the track of the outermost circumference of the optical disc 080. Therefore, the optical pickup 001 must access the outermost circumference so that the DVD objective lens 059 of the optical pickup 001 be positioned exactly at the track of the outermost circumference of the optical disc 080 as shown in FIG. 3A.

Thus, unless the DVD objective lens 059 can be positioned exactly at the track of the outermost circumference of the optical disc 080 when the optical pickup 001 accesses the outermost circumference, the information in the outermost circumference cannot be read.

Moreover, when reading the BD innermost circumference, the optical beam emitted from the optical pickup 001 must be applied to the track at the innermost circumference of the optical disc 080. Therefore, the optical pickup 001 must access the innermost circumference so that the BD objective lens 016 of the optical pickup 001 be positioned exactly at the track at the innermost circumference of the optical disc 080 as shown in FIG. 3B.

Thus, unless the DVD objective lens 016 can be positioned exactly at the track at the innermost circumference of the optical disc 080 when the optical pickup 001 accesses the innermost circumference, the information in the innermost circumference cannot be read.

When two objective lenses are arranged in the optical disc radial direction as mentioned above, the gap between the two objective lenses must be minimized so that both objective lenses can read the information signals at the innermost and outermost circumferences. With the gap between the two objective lenses arranged in this manner, if the angle θ between the traveling directional angle of the optical beam entering the BD upward-reflection mirror 015 and that of the optical beam entering the DVD upward-reflection mirror 058 is zeroed, i.e., the two optical beams are in parallel as shown in FIG. 2, there arises a problem of interference between BD and DVD optical components. Therefore, the traveling direction of the optical beam entering the DVD upward-reflection mirror 058 is tilted by an angle of θ with respect to that of the optical beam entering the BD upward-reflection mirror 015 as shown in FIG. 1.

Moreover, although the general configuration of the optical pickup 001 is such that it accesses in the 45-degree radial direction of the optical disc drive 101 in the drawing, giving a slight angle with respect to the radial direction as shown in the drawing is also effective for increasing the optical mounting space of the optical pickup.

Then, when two objective lenses are arranged in the optical disc radial direction, another possible configuration is such that, instead of applying the optical beam from the same direction to the two objective lenses as shown in FIG. 1, the BD optical beam is applied from the optical disc radial direction.

Figure 4:
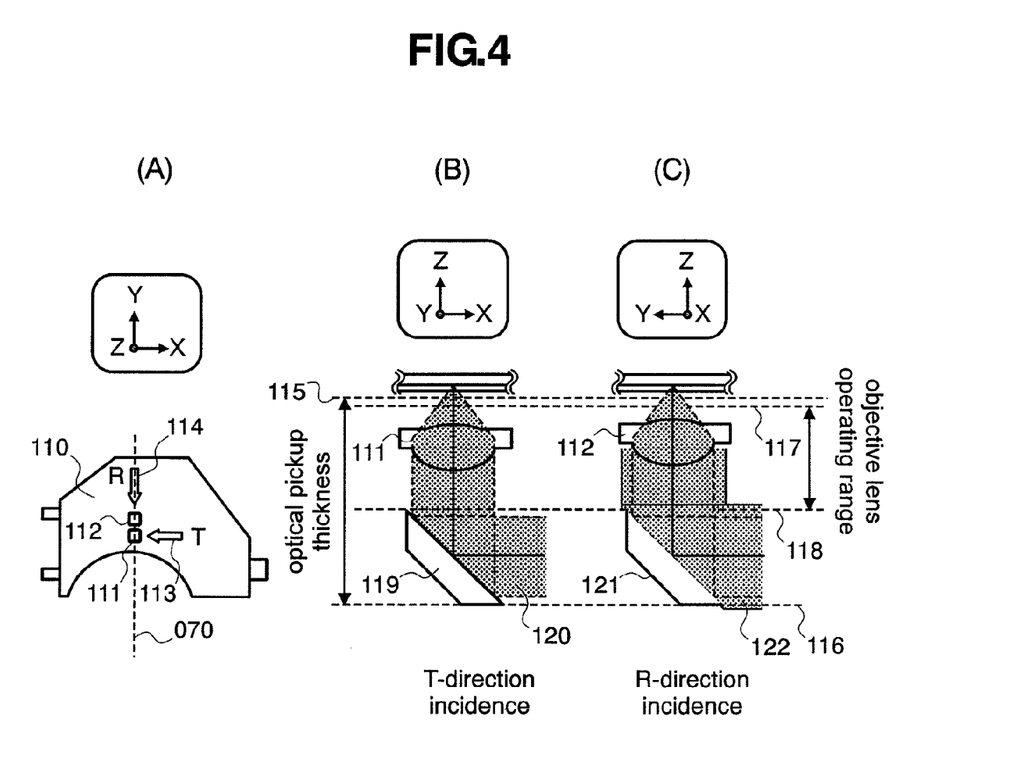
FIG. 4 is a schematic diagram showing a difference between an R-direction incidence and a T-direction incidence according to the first embodiment of the present invention.

FIG. 4 is a diagram showing a problem which may arise when an optical beam is applied from the optical disc radial direction. FIG. 4A is a diagram showing the objective lenses of the optical pickup and the direction of the optical beam applied thereto. FIG. 4B is a diagram showing a cross section of the upward-reflection mirror and the objective lens when the optical beam is applied from the optical disc tangential direction (T-direction incidence). FIG. 4C is a diagram showing a cross section of the upward-reflection mirror and the objective lens when the optical beam is applied from the optical disc radial direction (R-direction incidence).

As shown in FIG. 4A, the optical pickup 110 incorporates two objective lenses 111 and 112 arranged along a dotted line 070 which agrees with the optical disc radial direction. Application of the optical beam to the objective lens 111 from the optical disc tangential direction (direction indicated by an arrow 113) is referred to as T-direction incidence, and application of the optical beam to the objective lens 112 from the optical disc radial direction (direction indicated by an arrow 114) is referred to as R-direction incidence.

In FIG. 4B and FIG. 4C, a dotted line 115 indicates an upper height limit of the optical pickup, a dotted line 116 a lower height limit of the optical pickup, a dotted line 117 an upper operating limit of the objective lenses 111 and 112 in the height direction, and a dotted line 118 a lower operating limit of the objective lenses 111 and 112 in the height direction.

In the case of T-direction incidence in FIG. 4B, the direction of lens shift of the objective lens 111, i.e., the optical disc radial direction, agrees with a direction perpendicular to the paper surface of the drawing (Y direction in the drawing). Therefore, in the case of the T-direction incidence, no margin of optical beam is required for lens shift.

In the case of the R-direction incidence shown in FIG. 4C, conversely, the direction of lens shift of the objective lens 112, i.e., the optical disc radial direction, agrees with the horizontal direction of the paper surface of the drawing (Y direction in the drawing). Therefore, a margin of optical beam is required for lens shift. This is because the optical beam effective diameter shown in FIG. 4C is larger than that shown in FIG. 4B.

Specifically, in connection with the height direction of the optical pickup, the T-direction incidence as shown in FIG. 4B is more advantageous, i.e., has an advantage that the height of the optical pickup can be reduced.

Moreover, the T-direction incidence has another advantage that a wide operating range of objective lenses can be secured because of a small effective diameter.

For the R-direction incidence, dimensions of components in the height direction of the optical pickup are large, which results in an increase in the number of defective outer shapes at the time of optical pickup mass production, which may remarkably reduce the adaptability to mass production. The adaptability to mass production is a major factor when determining the cost of the optical pickup. Specifically, the T-direction incidence has a major advantage of high adaptability to mass production because of a wide margin in the height direction of the optical pickup.

Then, as explained so far, the optical pickup 001 of the present invention includes a first laser light source which emits an optical beam with a first wavelength, i.e., the DVD laser light source 050; a second laser light source which emits an optical beam with a second wavelength shorter than the wavelength of the first laser light source, i.e., the BD laser light source 001; a first collimate lens which converts the optical beam emitted from the DVD laser light source 050 into an approximately-parallel optical beam, i.e., the DVD collimate lens 055; a second collimate lens which converts the optical beam emitted from the BD laser light source 001 into an approximately-parallel optical beam, i.e., the BD collimate lens 008; a first objective lens which converges the approximately-parallel optical beam from the DVD collimate lens 055 to the optical disc, i.e., the DVD objective lens 059; and a second objective lens which converges the approximately-parallel optical beam from the BD collimate lens 008 to the optical disc, i.e., the BD objective lens 016; wherein the DVD objective lens 055 and BD objective lens 016 are arranged in the optical disc radial direction, i.e., a direction which agrees with the dotted line 070, and the BD objective lens 016 is arranged closer to the side of the optical disc outer circumference than the DVD objective lens 059.

Moreover, since the DVD collimate lens 055 is arranged on right-hand side when the BD objective lens 016 is viewed from the DVD objective lens 059, the BD collimate lens 008 is arranged on the left-hand side when the DVD objective lens 059 is viewed from the BD objective lens 016.

Moreover, the gap between the DVD collimate lens 055 and the DVD objective lens 059 is made longer than the gap between the BD collimate lens 008 and the BD objective lens 016.

Furthermore, the traveling direction of the optical beam entering the DVD collimate lens 055 and that of the optical beam entering the BD collimate lens 008 forms an angle of 0 to 15 degrees.

Moreover, a collimate lens drive unit for operating the BD collimate lens 008, i.e., the BD collimate lens drive unit 011 is arranged in a direction which is in parallel with the traveling direction of the optical beam entering the BD collimate lens 008. The BD collimate lens drive unit 011 is arranged closer to the side of the optical disc outer circumference than the BD objective lens 016.

By arranging the optical components of the optical pickup in this manner, it is possible to offer an optical pickup to be mounted on a thin optical disc drive.

Moreover, it is also an advantage of the optical pickup of the present invention that the conventional general DPP can be used for both optical systems by arranging two objective lenses in the optical disc radial direction.

Moreover, the use of completely independent components for the BD and DVD optical systems can eliminate common optical components and therefore is effective for improving the transmission efficiency of optical components.

Although the first embodiment assumes the astigmatic detection for detection of FES and the DPP for detection of TES, the use of other methods, for example, a spot size method for detection of FES and a combination with DPP for detection of TES causes no problem.

When accessing predetermined radial positional information on the optical disc, the optical pickup is moved in the optical disc radial direction and therefore inertia force occurs in the BD collimate lens in the direction opposite to the direction of movement of the optical pickup. Specifically, if there is a component of the radial direction of the optical disc in the movable direction of the BD collimate lens, each time the optical pickup accesses information, the BD collimate lens is moved in the optical disc radial direction by inertia force. Thus, if the BD collimate lens moves each time the optical pickup accesses information, spherical aberrations correction must be performed each time the optical disc drive accesses information, resulting in a long write and read processing time of the optical disc drive.

In order to avoid movement of the BD collimate lens in the radial direction by this inertia force, it would be preferable that the BD collimate lens is arranged so that its movable direction be perpendicular to the optical disc radial direction and a restriction be given in the optical disc radial direction so that the lens does not move even if force is applied.

For this reason, in FIG. 1, the traveling direction of the optical beam traveling between the BD collimate lens 008 and the BD objective lenses 016 is made in agreement with a direction perpendicular to the optical disc radial direction, and the traveling direction of the optical beam traveling between the DVD collimate lens 055 and the DVD objective lenses 059 is tilted by an angle of θ with respect to a direction perpendicular to the optical disc radial direction.

In the DVD optical system, since optical components are fixed with adhesive agent or the like and there are no operating optical components such as the BD collimate lens 008, no optical components are moved by inertia force.

Second Embodiment

A second embodiment of the present invention will be explained below in detail with reference to the accompanying drawings. The following explains an optical pickup mounted on a thin optical disc drive for BD, DVD, and CD.

Figure 5:
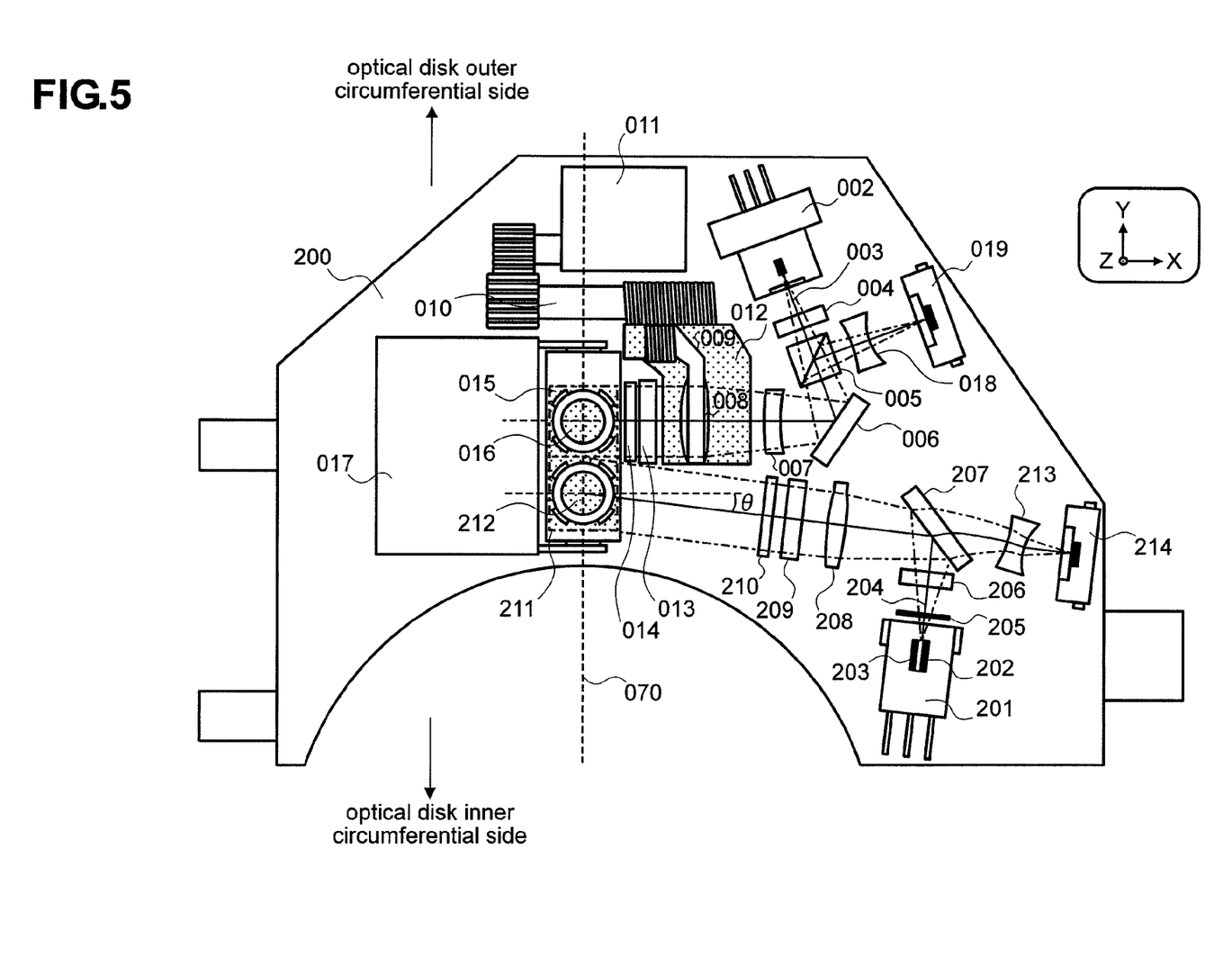
FIG. 5 is a schematic diagram showing a configuration of an optical pickup 200 according to a second embodiment of the present invention.

FIG. 5 is a schematic diagram showing a configuration of an optical pickup 200 according to the second embodiment. Since the optical pickup 200 according to the second embodiment uses the same BD optical system of the optical pickup 001 of the first embodiment, their explanations are omitted. Unlike the optical pickup 001 according to the first embodiment, the optical pickup 200 according to the second embodiment is applied to CD and therefore the optical pickup 200 mounts a two-wavelength multi-laser light source 201 instead of the DVD laser light source 050.

The two-wavelength multi-laser is a laser light source mounting in its case two laser chips which emit optical beams with different wavelengths. It is common that semiconductor laser with a wavelength of 660 nm is used to write information to or read information from to DVD, and semiconductor laser with a wavelength of 780 nm to write information to or read information from to CD. Therefore, two-wavelength multi-laser 201 mounts a DVD laser chip 202 which emits an optical beam with a wavelength of about 660 nm as well as a CD laser chip 203 which emits an optical beam with a wavelength of about 780 nm. Then, the following explains the DVD optical system.

A DVD optical beam is emitted as divergence light from the DVD laser chip 202 of the two-wavelength multi-laser 201. Moreover, it is assumed that the DVD laser chip 202 also emits a linearly-polarized optical beam. The path of the DVD optical beam emitted from the DVD laser chip 202 is shown by a solid line 204. Dashed lines in line-symmetry with respect to the solid line 204 indicate the outermost circumference of the diffusion of the optical beam.

The optical beam emitted from the DVD laser chip 202 enters a wideband half wavelength plate 205 and is converted into linearly-polarized light in a predetermined direction. When optical beams with a wavelength of about 660 nm and a wavelength of about 780 nm enter the wideband half wavelength plate 205, the wideband half wavelength plate 205 functions as a half wavelength plate to both wavelengths. This half wavelength plate is a common optical element for existing DVD/CD compatible optical pickups.

The optical beam enters a wavelength selective diffraction grating 206. When an optical beam with a wavelength of about 660 nm enters the wavelength selective diffraction grating 206, the optical beam is branched with diffraction angle θ DVD; when an optical beam with a wavelength of about 780 nm enters it, the optical beam is branched with angle θ CD which is different from diffraction angle θ DVD. Such a wavelength selective diffraction grating can be manufactured by arranging the groove depth and refractive index of the diffraction grating and is used for an optical pickup mounting a recent two-wavelength multi-laser light source. Then, the optical beam is branched into a main light beam and two sub light beams by the wavelength selective diffraction grating 206 (paths of sub light beams not shown). The two sub light beams are used to generate DPP and DAD signals.

After passing through the wavelength selective diffraction grating 206, the optical beam reflects off a beam splitter 207 and then converted into an approximately-parallel optical beam by a collimate lens 208.

After passing through the collimate lens 208, the optical beam enters a liquid crystal aberration correction element 209 having a function for correcting coma aberrations in a predetermined direction for the DVD optical beam. Moreover, patterns are arranged also for the CD optical beam so that coma aberrations be corrected like DVD, with a different amount of correction.

After passing through the liquid crystal aberration correction element 209, the optical beam enters a wideband quarter wavelength plate 210 and is converted into circularly-polarized light. The wideband quarter wavelength plate 210 is also an optical component which functions as a quarter wavelength both for the DVD and CD optical beams.

After passing through the wideband quarter wavelength plate 210, the optical beam reflects off an upward-reflection mirror 211 in the z direction, enters a DVD/CD compatible objective lens 212, and is converged onto the DVD data layer (not shown). The DVD/CD compatible objective lens 212, mounted on an actuator 017, can be operated in the y and z directions in the drawing. Also for the DVD/CD compatible objective lens 212, an area within an effective diameter of the lens is hatched in the drawing. Moreover, for the DVD/CD compatible objective lens as mentioned above, the DVD and CD wavelengths, NA, and cover layer thickness can be corrected through the use of objective lenses of diffraction type.

After reflecting off the data layer, the optical beam passes through the DVD/CD compatible objective lens 212, the upward-reflection mirror 211, the wideband quarter wavelength plate 210, the liquid crystal aberration correction element 209, the collimate lens 208, the beam splitter 207, and a detection lens 213, then reaches a PD 214. When the optical beam penetrates through the beam splitter 213, astigmatism is given for detection of the FES. The function of the detection lens 213 is to rotate the astigmatism in a desired direction as well as determine the size of the light spot converged onto the PD 214. The optical beam guided by the PD 213 is used for detection of the information signal recorded on the DVD data layer and detection of positional control signals, such as TES and FES, for the light spot converged onto the DVD data layer.

Moreover, a dotted line 070 in the x direction agrees with the optical disc radial direction as well as the optical pickup seek direction. Moreover, as shown in the drawing, the topside corresponds to the optical disc outer circumferential direction and the bottom side the optical disc inner circumferential direction.

Although two lenses (the DVD/CD compatible objective lens 212 and the BD objective lens) are mounted, when actually creating the optical pickup 200, an optimal tilt angle in each of the optical disc radial and tangential directions may differ between the DVD/CD compatible objective lens 059 and the BD objective lens 016. A liquid crystal aberration correction element 056 is mounted to correct the shift of this optimal tilt angle. Since the shift of the tilt angle corresponds to coma aberrations, the liquid crystal aberration correction element 056 is mounted so that coma aberrations in the optical disc radial and tangential directions be corrected.

The following explains the CD optical system.

A CD optical beam is emitted as divergence light from the CD laser chip 203 of the two-wavelength multi-laser 201. Moreover, it is assumed that the CD laser chip 203 also emits a linearly-polarized optical beam. Since the path of the CD optical beam emitted from the CD laser chip 203 is almost the same as that for DVD, the CD optical path itself is omitted assuming that the solid line 204 agrees with the CD path.

The optical beam emitted from the CD laser chip 203 enters the wideband half wavelength plate 205 and is converted into linearly-polarized light in a predetermined direction.

Then, the optical beam enters the wavelength selective diffraction grating 206 and is branched into a main light beam and two sub light beams with diffraction angle θ CD which is different from diffraction angle θ DVD (paths of sub light beams not shown). The two sub light beams are used to generate DPP and DAD signals.

After passing through the wavelength selective diffraction grating 206, the optical beam reflects off the beam splitter 207 and is converted into an approximately-parallel optical beam by the collimate lens 208.

After passing through the collimate lens 208, the optical beam enters the liquid crystal aberration correction element 209 having a function for correcting coma aberrations in a predetermined direction also for the CD optical beam.

After passing through the liquid crystal aberration correction element 209, the optical beam enters the wideband quarter wavelength plate 210 and is converted into circularly-polarized light.

After passing through the wideband quarter wavelength plate 210, the optical beam reflects off the upward-reflection mirror 211 in the z direction, enters the DVD/CD compatible objective lens 212, and is converged onto the CD data layer (not shown).

After reflecting off the data layer, the optical beam passes through the DVD/CD compatible objective lens 212, the upward-reflection mirror 211, the wideband quarter wavelength plate 210, the liquid crystal aberration correction element 209, the collimate lens 208, the beam splitter 207, and the detection lens 213, then reaches the PD 214. When the optical beam penetrates through the beam splitter 213, astigmatism is given, like DVD, for detection of the FES. The function of the detection lens 213 is to rotate the astigmatism of the CD optical beam in a desired direction, like the DVD optical beam, as well as determine the size of the light spot converged onto the PD 214. The optical beam guided by the PD 213 is used for detection of the information signal recorded on the CD data layer and detection of positional control signals, such as TES and FES, for the light spot converged onto the CD data layer.

It is possible to easily provide a thin optical pickup for three different media BD, DVD, and CD based on the optical pickup 001 according to the first embodiment using the two-wavelength multi-laser as the DVD optical system, like the optical pickup 200, and mounting above-mentioned optical components.

Moreover, the use of completely independent components for the BD and DVD optical systems with different two-wavelengths can eliminate common optical components and therefore is effective for improving the transmission efficiency of optical components.

Third Embodiment

A third embodiment of the present invention will be explained below in detail with reference to the accompanying drawings. The following explains a variation of the second embodiment.

Figure 6:
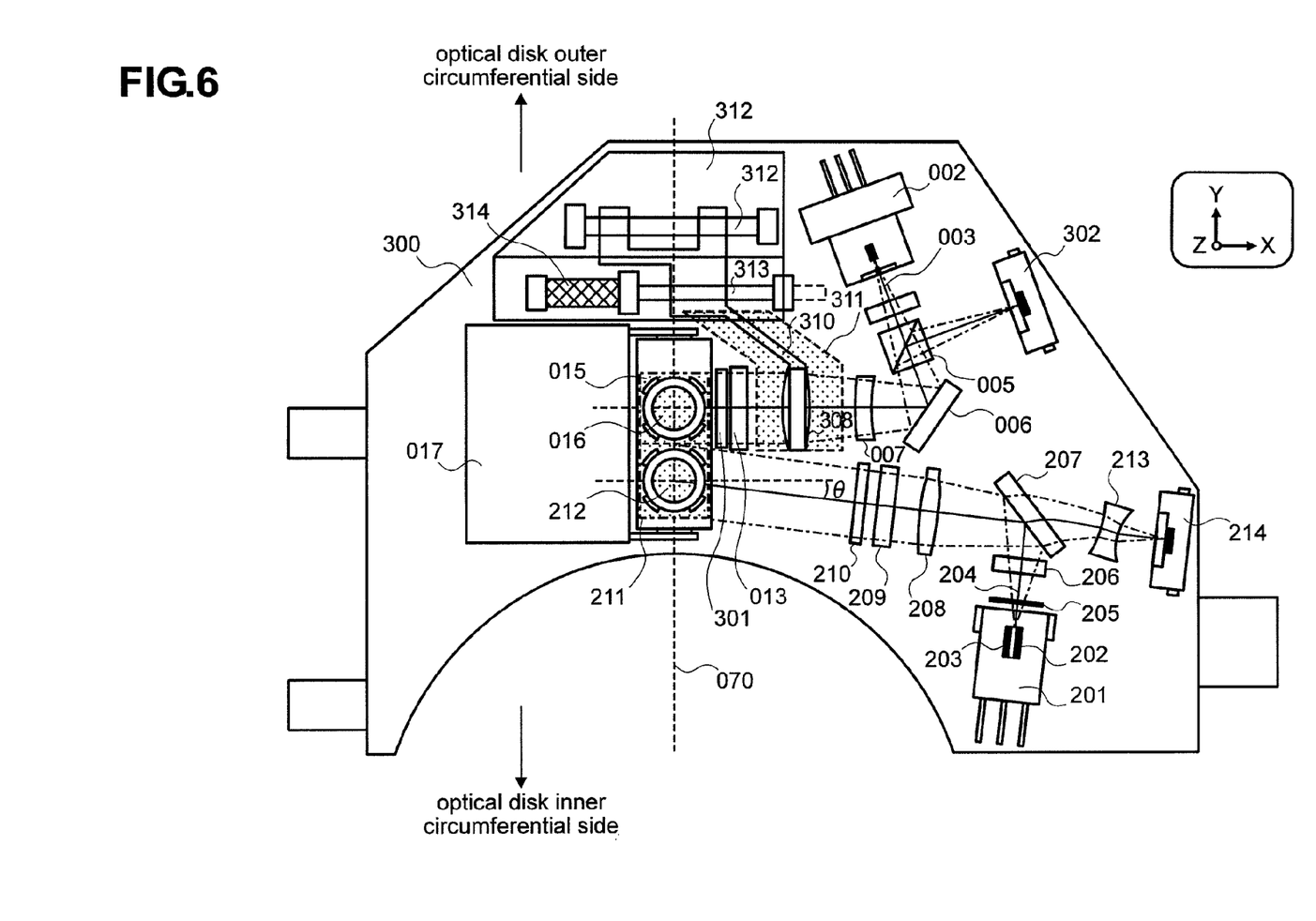
FIG. 6 is a schematic diagram showing a configuration of an optical pickup 300 according to a third embodiment of the present invention.

FIG. 6 is a schematic diagram showing an optical pickup 300 in a thin optical disc drive for BD, DVD and CD.

Regarding the optical pickups 001 according to the first embodiment and the optical pickup 200 according to the second embodiment, a combination of the DPP and DAD has been explained as a method for detecting TES and FES for BD. For the third embodiment, the use of the PP method for detection of TES and a knife edge for detection of FES will be explained as a variation of the above-mentioned method.

The optical pickup 300 is a modified version of the optical pickup 200: the BD diffraction grating 003, the detection lens 005, and the BD quarter wavelength plate 014 of the optical pickup 200 have been removed; a multi-functional element 301, and a PD 302 with a different light-sensitive area pattern in PD from the PD 019 added; and the collimate lens drive element 011 replaced with a BD collimate lens drive element 312 formed of a piezoelectric element. Since the DVD and CD optical systems are not modified in particular, their explanations are omitted.

Taking notice of the above-mentioned modified points, the BD optical system will be explained below.

An optical beam of the 405-nm band is emitted as divergence light of linearly-polarized light from the BD laser light source 002. The optical beam emitted from the BD laser light source 002 passes through a polarization beam splitter 005, a reflecting mirror 006, and an auxiliary lens 007, then is converted into an approximately-parallel optical beam by a BD collimate lens 008. The BD collimate lens 008 is mounted on a lens holder 310 which is connected with a BD collimate lens drive unit 312, where a BD collimate lens drive unit 011 using a piezoelectric element.

This BD collimate lens drive element 314 mounts a piezoelectric element 314 which expands and contracts in the x direction in the drawing by applying a voltage. By operating a lens holder 313 using expansion and contraction of the piezoelectric element, the BD collimate lens 008 can be operated in a direction in parallel with the optical beam entering the BD collimate lens 008. The lens holder is fixed to a shaft 313 and supported by a shaft 312 to realize stable operation of the BD collimate lens. Generally, the use of a piezoelectric element is more advantageous for downsizing than the use of a stepping motor. Therefore, the use of a piezoelectric element for the collimate lens drive unit has an advantage that the optical pickup can be downsized.

After passing through the BD collimate lens 008, the optical beam passes through a chromatic aberration correction element 013 and then enters the multi-functional element 301 which is a compact element formed by sticking a polarization diffraction grating to a quarter wavelength plate. The polarization diffraction grating diffracts the linearly-polarized optical beam in a predetermined direction, and transmits the linearly-polarized optical beam in a direction perpendicular to the predetermined direction. Therefore, the multi-functional element 301 mounting a polarization diffraction grating and a quarter wavelength plate transmits the optical beam traveling from right to left on the paper surface and diffracts the optical beam traveling from left to right on the paper surface. Specifically, the optical beam coming from the chromatic aberration correction element passes through the area of the polarization diffraction grating of the multi-functional element 301 and is converted into circularly-polarized light by the quarter wavelength plate. The optical beam returned to circularly-polarized light by the multi-functional element 301 reflects off a BD upward-reflection mirror 015 in the z direction, enters a BD objective lens 016, and is converged onto the BD data layer (not shown).

After reflecting off the data layer, the optical beam enters the BD objective lens 016, the BD upward-reflection mirror 015, and the multi-functional element 301. After entering the multi-functional element 301, the optical beam is converted into linearly-polarized light in a direction perpendicular to the forward path from circularly-polarized light in the area of the quarter wavelength plate, then branched into a plurality of optical beams in the area of the polarization diffraction grating. As long as the knife edge can be used for detection of FES and the PP method for detection of TES, any desired patterns are acceptable as a grating groove pattern for the polarization diffraction grating. Moreover, since the knife edge and PP method are also well-known methods, their explanations are omitted. The optical beam branched into a plurality of optical beams by the multi-functional element 301 passes through the chromatic aberration correction element 013, the BD collimate lens 008, the auxiliary lens 007, the reflecting mirror 006, and the polarization beam splitter 005, then reaches a BDPD 302. The optical beam guided by the BDPD 302 is used for detection of the information signal recorded on the BD data layer and detection of positional control signals, such as TES and FES, for the light spot converged onto the optical disc. Moreover, since an assumed detection method is different from that of the optical pickups 001 and 200, the light-sensitive area pattern is different from that of a BDPD 019. However, as long as the above methods can be used, any desired light-sensitive area patterns are acceptable.

As mentioned above, the use of the present invention makes it possible to use detection methods different from those of the optical pickup 100, like the optical pickup 300, realizing a variety of optical pickups.

Although a combination of the knife edge and PP method has been explained above, the present invention can also be applied to a case when optical components has been modified, for example, by using the spot size method together with the PP method.

Fourth Embodiment

In a fourth embodiment, an optical disc drive 400 mounting an optical pickup for three different media CD, DVD, and BD explained in the above-mentioned embodiments will be explained.

Figure 7:
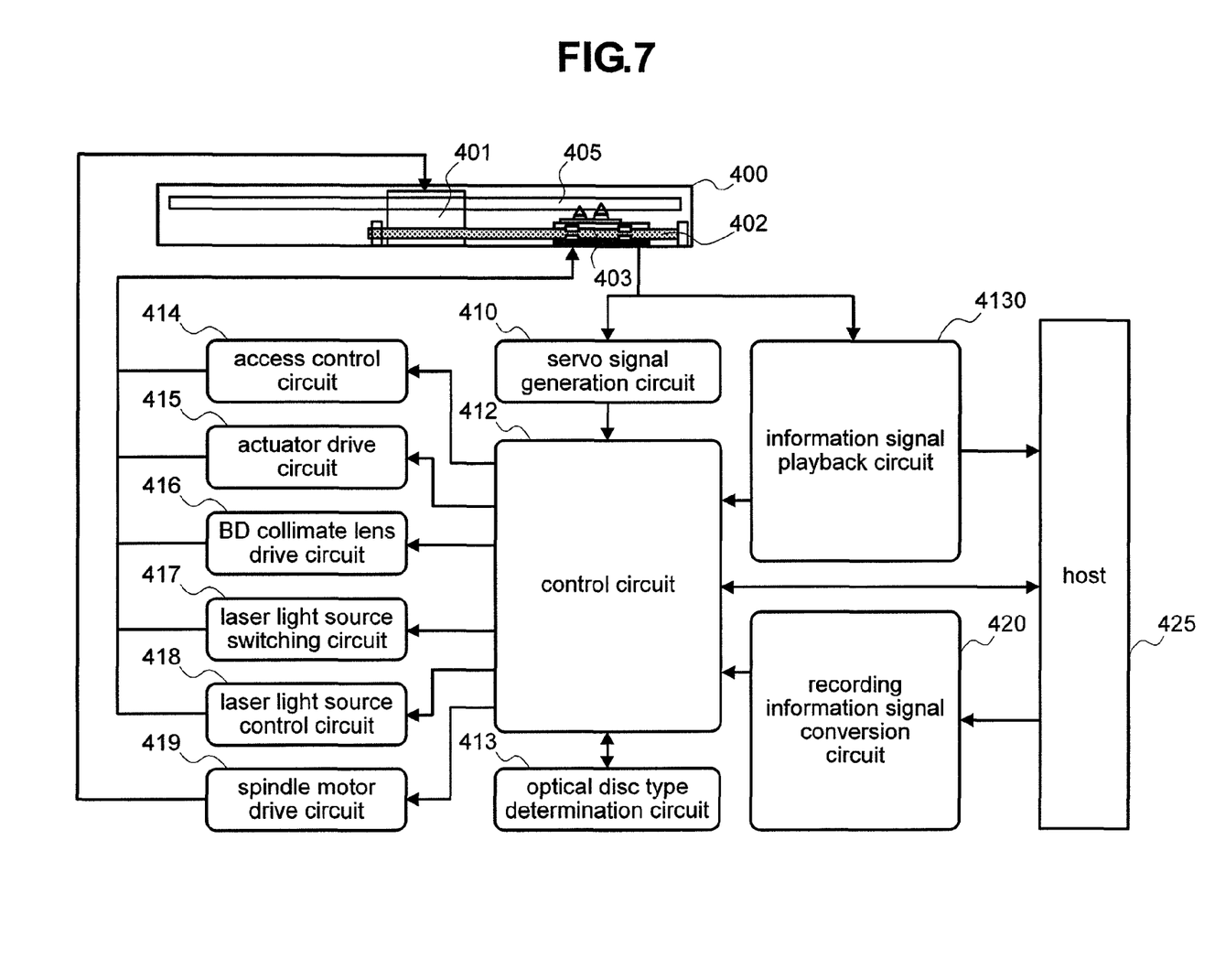
FIG. 7 is a schematic diagram showing a configuration of an optical disc drive 400 according to a fourth embodiment of the present invention.

FIG. 7 is a diagram showing the optical disc drive 400 mounting an optical pickup 403 and a schematic circuit configuration of the optical disc drive 400.

The optical disc drive 400 incorporates an optical disc 405 fixed to a spindle 401 which rotates the optical disc 405.

Moreover, the optical disc drive 400 incorporates a guide bar 402 along which the optical pickup 403 can access a predetermined radial position of an optical disc 400.

A host 425 indicates an information appliance using an optical disc drive, such as a personal computer. When an instruction for reading information on the optical disc 405 is inputted from the host 425 to a control circuit 412 in the optical disc drive 400, the control circuit activates a spindle motor drive circuit 419 to operate the spindle 401, starting revolution of the optical disc 405.

Then, the control circuit 412 activates a laser light source switching circuit to drive a DVD laser light source in an optical pickup 402. Then, the control circuit 412 activates a laser light source control circuit 418 to turn on the DVD laser light source by the reading power.

Then, the control circuit 412 activates an actuator drive circuit 415 to operate an actuator in the optical pickup 402 in the height direction. A signal detected from a PD of the optical pickup 403 is transmitted to a servo signal generation circuit 410, and a FES is generated from the detected signal. The control circuit 412 activates an optical disc type determination circuit 413 to determine the medium type of the optical disc 405 based on the FES. Since each of BD, DVD, and CD has a different cover layer thickness, the medium type can be determined by detecting from the FES the gap between the data layer and the surface of the optical disc 405, i.e., the cover layer thickness.

The reason why the DVD laser light source is first turned on is that amplitude degradation of the FES caused by spherical aberrations can be minimized regardless of whether the optical disc 405 is CD or BD because the cover layer thickness of DVD is intermediate in comparison with that of CD and BD. For example, the amplitude of the FES detected from CD under the BD read condition is very small because of the influence of spherical aberrations, making it difficult to detect the CD data layer.

A control circuit 412 activates a laser switching circuit 417 to drive a laser light source corresponding to the optical disc determined by the optical disc type determination circuit 413. Then, the control circuit 412 activates the laser light source control circuit 418 to turn on the laser light source by the reading power.

Then, the control circuit 412 activates the actuator drive circuit 415 to operate again the actuator in the optical pickup 402 in the height direction. The signal detected from the PD of the optical pickup 403 is retransmitted to the servo signal generation circuit 410 to generate servo signals FES and TES. The generated servo signals are transmitted from the control circuit 412 to the actuator drive circuit 415 as required, to operate the actuator in the optical pickup 403, perform positional control of objective lenses, and converge optical beams to a predetermined data layer. The control circuit 412 also has a function for activating an access control circuit 414 to move the optical pickup 403 to a predetermined radial position along the guide bar 402.

Then, after converging optical beams to the data layer of the optical disc 405, the detected signal from the PD in the optical pickup 403 is transmitted to an information signal playback circuit 4130. The information signal playback circuit 4130 reads an information signal recorded on the optical disc 405 from the above-mentioned detected signal and outputs the information signal to the host 425.

For example, if the optical disc 405 is a BD, the control circuit 412 also activates a BD collimate lens drive circuit 416 to perform spherical aberrations correction so as to maximize the reading performance (for example, jitter and amplitude of detected signal) for the information signal generated from the above-mentioned information signal playback circuit 4130.

By activating the circuit of the optical disc drive 400 as mentioned above, the host 425 can acquire desired read information.

Then, if an instruction for recording information to the optical disc 405 is inputted from the host 425 to the control circuit 412, the control circuit performs the same operation as the above-mentioned read operation and then turns on a laser light source which is suitable for the optical disc 405 to converge the optical beam onto the optical disc 405.

Then, recording information is inputted from the host 425 to a recording information signal conversion circuit 420, then is converted into a recording signal which is suitable for a predetermined medium by the recording information signal conversion circuit 420. This recording signal is transmitted to the control circuit 412. Then, the control circuit 412 activates the laser light source control circuit 418 to perform power control of the laser light source and writes the recording signal to the optical disc 405. At this time, the control circuit 412 activates the access control circuit 414 and the spindle motor drive circuit 419 to perform access control of the optical pickup 402 and rotational control of an optical disc 401 according to the recording signal.

By activating the circuit of the optical disc drive 400 as mentioned above, the recording information received from the host can be written to the optical disc 405.

Although the embodiment of the optical disc drive 400 has been explained above, the present invention is not limited to this embodiment as long as at least the BD collimate lens drive circuit 416 and the laser light source switching circuit 417 are mounted.

While we have shown and described several embodiments in accordance with our invention, it should be understood that disclosed embodiments are susceptible to changes and modifications without departing from the scope of the invention. Therefore, we do not intend to be bound by the details shown and described herein but intend to cover all such changes and modifications as falling within the ambit of the appended claims.

What is claimed is:

1. An optical pickup which exchanges information with an optical disc by means of optical beams, the optical pickup comprising:
   a first laser light source which emits an optical beam with a first wavelength;
   a second laser light source which emits an optical beam with a second wavelength;
   a first collimate lens which adjusts the optical beam emitted from the first laser light source;
   a second collimate lens which adjusts the optical beam emitted from the second laser light source;
   a first objective lens which converges the optical beam from the first laser light source to an optical disc; and
   a second objective lens which converges the optical beam from the second laser light source to the optical disc;
   wherein
   the first and second collimate lens are arranged on the same side of a radial axis passing through the first objective lens and the second objective lens; and
   an optical axis of the optical beam from the first collimate lens is not parallel to an optical axis of the optical beam from the second collimate lens.

2. The optical pickup according to claim 1, further comprising a collimate lens drive unit which moves the first collimate lens along its optical axis and an auxiliary lens arranged between the first laser light source and the first collimate lens.

3. The optical pickup according to claim 1, wherein
   the first collimate lens is arranged on the right-hand side of a line between the first objective lens and the second objective lens viewed in the direction from the first objective lens toward the second objective lens; and
   the second collimate lens is arranged on the left-hand side of a line between the second objective lens and the first objective lens viewed in the direction from the second objective lens toward the first objective lens,
   or
   the first collimate lens is arranged on the left-hand side of a line between the first objective lens and the second objective lens viewed in the direction from the first objective lens toward the second objective lens; and
   the second collimate lens is arranged on the right-hand side of the line between the second objective lens and the first objective lens viewed in the direction from the second objective lens toward the first objective lens.

4. The optical pickup according to claim 3, wherein the gap between the first collimate lens and the first objective lens is lager than the gap between the second collimate lens and the second objective lens.

5. The optical pickup according to claim 4, wherein an optical axis of the optical beam from the first collimate lens and an optical axis of the optical beam from the second collimate lens are tilted with respect to each other.

6. The optical pickup according to claim 5, wherein
   a collimate lens drive unit for operating the second collimate lens is arranged in a direction which is in parallel with the traveling direction of the optical beam entering the second collimate lens; and
   the collimate lens drive unit is arranged closer to the side of the optical disc outer circumference than the second objective lens.

7. An optical disc drive, comprising:
   an optical pickup according to claim 5;
   a laser light source switching circuit for switching between the first and second laser light sources; and
   a collimate lens drive circuit for performing positional control of the second collimate lens using the collimate lens drive unit.

* * * * *